(12) United States Patent
Franssen et al.

(10) Patent No.: US 8,889,824 B2
(45) Date of Patent: Nov. 18, 2014

(54) GRAFTED POLY(ARYLSULFONE) AND A PROCESS FOR GRAFTING A POLY(ARYLSULFONE)

(75) Inventors: Maurice Charles René Franssen, Wageningen (NL); Remko Marcel Boom, Ede (NL); Norhan Nady Ibrahim Mohamed, Wageningen (NL); Catharina Gerarda Petronella Henrica Schroën, Heelsum (NL); Johannes Teunis Zuilhof, Bennekom (NL)

(73) Assignee: X-Flow BV, Enschede (NL)

( * ) Notice: Subject to any disclaimer, the term of this patent is extended or adjusted under 35 U.S.C. 154(b) by 0 days.

(21) Appl. No.: 13/810,291

(22) PCT Filed: Jul. 15, 2011

(86) PCT No.: PCT/NL2011/050514
§ 371 (c)(1),
(2), (4) Date: May 6, 2013

(87) PCT Pub. No.: WO2012/008837
PCT Pub. Date: Jan. 19, 2012

(65) Prior Publication Data
US 2013/0217839 A1 Aug. 22, 2013

Related U.S. Application Data

(60) Provisional application No. 61/364,911, filed on Jul. 16, 2010.

(30) Foreign Application Priority Data

Jul. 16, 2010 (EP) .................................... 10169842

(51) Int. Cl.
*C08G 75/00* (2006.01)
(Continued)

(52) U.S. Cl.
CPC ............... *C08G 75/23* (2013.01); *B01D 71/78* (2013.01); *B01D 71/68* (2013.01); *C08G 65/48* (2013.01)
USPC ............................ 528/373; 525/535; 435/130

(58) Field of Classification Search
USPC ............................ 528/373; 525/535; 435/130
See application file for complete search history.

(56) References Cited

U.S. PATENT DOCUMENTS

2008/0102342 A1* 5/2008 Cho et al. ........................ 429/33
2010/0029864 A1 2/2010 Hung et al.

FOREIGN PATENT DOCUMENTS

EP 0 827 026 A2 3/1998
(Continued)

OTHER PUBLICATIONS

International Search Report for PCT/NL2011/050514—mailed Mar. 23, 2012.
(Continued)

*Primary Examiner* — Shane Fang
(74) *Attorney, Agent, or Firm* — Gilberto M. Villacorta; Sunit Talapatra; Foley & Lardner LLP (57) ABSTRACT

The invention relates to a poly(arylsulfone), the poly(arylsulfone) having an aryl group grafted with a covalently attached substituent of the Formula (I): The invention also relates to a process for grafting a poly(arylsulfone), in the presence of an enzyme, for the preparation of said grafted poly(arylsulfone). The poly(arylsulfone) according to the invention shows beneficial properties for application in a membrane. The invention therefore further relates to a membrane comprising a poly(arylsulfone) according to the invention, and to the use of a poly(arylsulfone) according to the invention in a separation process. In addition, the invention relates to a polymer blend and a copolymer comprising a grafted poly(arylsulfone) according to the invention, and to a membrane comprising such polymer blend or copolymer.

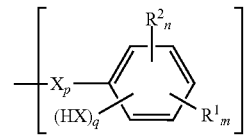

10 Claims, 2 Drawing Sheets (51) Int. Cl.
  *B01D 71/78* (2006.01)
  *C08G 65/48* (2006.01)
  *C08G 75/23* (2006.01)
  *B01D 71/68* (2006.01)

(56) References Cited

FOREIGN PATENT DOCUMENTS

| WO | WO-97/22406 A1 | 6/1997 |
| WO | WO-02/00270 A1 | 1/2002 |
| WO | WO-02/00762 A1 | 1/2002 |
| WO | WO-2009/024973 | 2/2009 |
| WO | WO-2009/098161 A1 | 8/2009 |

OTHER PUBLICATIONS

Hubner, G. et al., "EPR investigation of HO radical initiated degradation reactions of sulfonated aromatics as model compounds for fuel cell proton conducting membranes", Journal of Materials Chemistry, vol. 9, pp. 409-418, 1999.

Hyun et al., Restriction of biofouling in membrane filtration using a brush-like polymer containing oligoethylene glycol side chains, Journal of Membrane Science, vol. 282, pp. 52-59, 2006.

Kirk-Othmer, Encyclopedia of Chemical Technology, John Wiley & Sons, 4th Ed. vol. 19, pp. 945-968, 1996.

Zhou, M. et al., "High throughput synthesis and screening of new protein resistant surfaces for membrane filtration", American Institute of Chemical Engineers Journal, vol. 56, No. 7, pp. 1932-1945, Jul. 2010.

\* cited by examiner

GRAFTED POLY(ARYLSULFONE) AND A PROCESS FOR GRAFTING A POLY(ARYLSULFONE)

CROSS-REFERENCE TO RELATED APPLICATIONS

This application is the National Phase of International Patent Application No. PCT/NL2011/050514, filed Jul. 15, 2011, published as WO 2012/008837, which claims priority to European Application No. 10169842.1 and U.S. Provisional Application No. 61/364,911, both filed Jul. 16, 2010. The contents of these applications are herein incorporated by reference in their entirety.

FIELD OF THE INVENTION

The present invention is in the field of grafted poly(arylsulfones) and relates to a poly(arylsulfone) having an aryl group grafted with a covalently attached substituent. The invention also relates to a process for grafting a poly(arylsulfone) with an aromatic compound in the presence of an enzyme.

The invention further relates to a membrane comprising the grafted poly(arylsulfone). The invention also relates to the use of the grafted poly(arylsulfone) or the membrane in a separation process.

In addition, the invention relates to a polymer blend or a copolymer comprising a grafted poly(arylsulfone) according to the invention.

BACKGROUND OF THE INVENTION

Polymers are attractive materials for various applications, such as membrane separation, coatings, composites, microelectronic devices, thin-film technology, biomaterials, and so on. The performance of polymeric materials in many applications relies largely upon the combination of bulk (e.g. mechanical) properties in combination with the properties of their surfaces. However, polymers very often do not possess the surface properties needed for these applications. Vice versa, those polymers that have good surface properties frequently do not possess the mechanical properties that are critical for their successful application. Due to this dilemma, (surface) modification of polymers without changing the bulk properties has been a topical aim in research for many years, mostly because surface modification provides a potentially easier route than e.g. polymer blending to obtain new polymer properties.

In membrane separation processes, membrane fouling is a serious problem that may be reduced (or even prevented) using surface modification. Membrane fouling is the accumulation of substances on the membrane surface and/or within the membrane pores, which results in deterioration of membrane performance. The interaction between membrane surfaces and solution components plays an important role in the extent of membrane fouling. In ultrafiltration of e.g. protein-containing liquids, fouling occurs due to protein adsorption, denaturation, and aggregation at the membrane solution interface.

Aromatic polysulfones, also known as poly(arylsulfones), form a well known class of thermoplastic polymers (see for example Kirk-Othmer, "Encyclopedia of Chemical Technology", John Wiley & Sons, 4th Ed. 1996, Volume 19, p. 945-968). Poly(arylsulfones) are generally characterized by high glass-transition temperatures, good mechanical strength and stiffness, and excellent thermal and oxidative resistance. The backbone of a poly(arylsulfone) comprises sulfone, aryl and ether moieties as basic repeat units. Furthermore, additional connecting units may be present, such as for example isopropylene groups in polysulfone (PSF). Examples of poly(arylsulfones) include polysulfone (PSF), polyethersulfone (PES) and polyphenylsulfone (PPSF), and the repeat units of these polymers are shown below.

Poly(ethersulfone) (PES)

Polysulfone (PSF)

Poly(phenylsulfone) (PPSF)

Poly(arylsulfones) may be prepared via a nucleophilic substitution polycondensation route, wherein 4,4'-dichlorodiphenylsulfone is reacted with a bisphenol of choice (the phenol group is the nucleophile) in the presence of a base. By using a different bisphenol in the polycondensation reaction, a different type of poly(arylsulfone) with a different repeating unit and different bulk properties may be obtained. Bisphenols that may be used in the polycondensation reaction with dichlorodiphenylsulfone are for example 4,4'-dihydroxydiphenyloxide, 4,4'-dihydroxydiphenylsulfide, 4,4'-dihydroxydiphenylmethane, 2,2-bis(4-hydroxyphenyl)-propane (for the preparation of PSF), hydroquinone, 2,2-bis(4-hydroxyphenyl)-perfluoropropane, 4,4'-dihydroxybenzophenone, 4,4'-dihydroxydiphenylsulfone (for the preparation of PES), 4,4'-dihydroxydiphenyl (for the preparation of PPSF), 1,4-bis(4-hydroxyphenyl)benzene or 4,4'-bis(4"-hydroxybenzenesulfonyl)diphenyl.

Poly(arylsulfones) are very suitable polymers for the manufacture of membranes such as for example ultrafiltration and microfiltration membranes. Due to their structural and chemical stability, poly(arylsulfones) provide robustness to the membranes. However, poly(arylsulfones) have a hydrophobic nature, with a relatively low surface energy and high water contact angle, and membranes made from these materials are therefore vulnerable to adsorptive fouling. This disadvantage may be reduced by decreasing the hydrophobicity of poly(arylsulfones), for example via (surface) modification of the polymer. Various methods for the surface modification of poly(arylsulfone) and poly(arylsulfone) membranes are described in the prior art, such as for example coating, blending, composite, chemical, and grafting methods, and combinations thereof.

Blending is a process in which two (or more) polymers are physically mixed to obtain the required properties. Blend polymer membranes based on polyethersulfone in combination with, amongst others, polyethylene glycol, poly(vinylpyrrolidone) or cellulose acetate are known in the art.

Coating is a method wherein the coating material forms a thin layer that non-covalently adheres to the substrate. An example of the coating of polysulfone membranes with methyl methacrylate-based comb polymers with short oligoethylene glycol side chains that provide the membrane with long-term, bio-repellent surfaces is disclosed by Hyun et al. (*J. Membr. Sci.*, 2006, 282, 52-59, incorporated by reference). Cell-lysate flux recovery increased from 47% for unmodified polysulfone membranes to 94% for the coated membrane, and presumably this is caused by the hydrophilic polyethylene oxide groups on the surface.

For chemical modification, the membrane material is treated with modifying agents to introduce various functional groups on the membrane surface. For example WO 2009/024973, incorporated by reference, discloses a chemically modified polysulfone polymer substituted in one or more of the phenyl rings by functional groups selected from (i) —CO—$R_1$, wherein $R_1$ is OH, halohydrocarbyloxy, a mono- or oligosaccharide residue or a derivative thereof, (ii) —CON($R_2$)$R_3$, wherein $R_2$ is H or hydrocarbyl and $R_3$ is a monosaccharide or oligosaccharide residue or a derivative thereof, (iii) —B(O$R_2$)$_2$ wherein $R_2$ is H or hydrocarbyl, (iv) —P(=O)(O$R_2$)$_2$ wherein $R_2$ is H or hydrocarbyl and (v) —CO—O—$R_4$—O—CO— linking two chains of the polymer backbone, wherein $R_4$ is alkylene. These modified polysulfones are suitable for composing membranes.

Grafting is a method wherein monomers, oligomers or polymers are covalently bonded onto the membrane. Grafting may occur either through 'grafting-to' polymerization (coupling of polymers to the surface of the membrane), or through 'grafting-from' polymerization (monomers are polymerized using an initiation site on the membrane surface). Polysulfone-graft-copolymers are disclosed in for example WO 2009/098161, incorporated by reference. WO 2009/098161 relates to alkoxyamine functionalized polysulfones, to a process for the functionalization of polysulfones with nitroxide initiators and subsequent nitroxide-mediated radical polymerizations to yield polysulfone-graft-copolymers, and to these graft-copolymers, which may be used as membranes.

Chemical surface modification and surface grafting methods result in a covalent attachment of the substituents and/or graft chains, and have the advantage of a long-term chemical stability. This stability is not obtained with for example physically coated polymer chains that may often be removed rather easily. In addition, grafting and chemical modification methods have the advantage that modification of the polymer surface to have distinct properties is feasible through the choice of different substituents.

One of the disadvantages of the chemical and grafting modification methods known in the art is that, due to the inert nature of poly(arylsulfones), severe reaction conditions are necessary for the modification, running the risk of undesirable surface changes, undesired side-reactions and degradation reactions, and contamination.

SUMMARY OF THE INVENTION

The present invention relates to a poly(arylsulfone) having an aryl group grafted with a covalently attached substituent of the Formula (I):

wherein:
m is 0-5;
n is 0-5;
p=0 and q=1, or p=1 and q=0;
X is O, S or NH;
$R^1$ is independently selected from an electron-donating group having a negative value for the para-Hammett substituent constant $\sigma_p$, $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups, $C_6$-$C_{12}$ alkyl(hetero)aryl groups, $C_1$-$C_{12}$ alkoxy groups, $C_2$-$C_{12}$ alkenyloxy groups and $C_2$-$C_{12}$ alkynyloxy groups, wherein the alkyl groups, alkenyl groups, alkynyl groups, (hetero)aryl groups, (hetero)arylalkyl groups, alkyl(hetero)aryl groups, alkoxy groups, alkenyloxy groups and $C_2$-$C_{12}$ alkynyloxy groups are optionally substituted, and wherein the alkyl groups, alkenyl groups, alkynyl groups, alkoxy groups, alkenyloxy groups, alkynyloxy groups and the alkyl part of (hetero)arylalkyl groups and alkyl(hetero)aryl groups are optionally interrupted by one or more heteroatoms;
$R^2$ is independently selected from halogen, —Y$R^3$, —$R^4$Y$R^3$, —N($R^3$)$_2$, —$R^4$N($R^3$)$_2$, —C(Y)$R^3$, —$R^4$C(Y)$R^3$, —C(Y)Y$R^3$, —$R^4$C(Y)Y$R^3$ and —{$X_p$[$C_6$(XH)$_q$($R^1$)$_m$($R^2$)$_n$]}$_r$, wherein $R^1$, $R^2$, X, m, n, p and q are as defined above, wherein r is 1-200, wherein Y is O or S, wherein $R^3$ is independently selected from hydrogen, $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups and $C_6$-$C_{12}$ alkyl(hetero)aryl groups, wherein $R^4$ is independently selected from $C_1$-$C_{12}$ alkylene groups, $C_2$-$C_{12}$ alkenylene groups, $C_2$-$C_{12}$ alkynylene groups, $C_5$-$C_{12}$ (hetero)arylene groups, $C_6$-$C_{12}$ (hetero)arylalkylene groups, $C_6$-$C_{12}$ alkyl(hetero)arylene groups, $C_6$-$C_{12}$ alkylene(hetero)arylene groups, $C_7$-$C_{12}$ alkenylene(hetero)arylene groups, $C_7$-$C_{12}$ alkynylene(hetero)arylene groups, wherein the alkyl groups, alkenyl groups, alkynyl groups, (hetero)aryl groups, (hetero)arylalkyl groups, alkyl(hetero)aryl groups, alkylene groups, alkenylene groups, alkynylene groups, (hetero)arylene groups, (hetero)arylalkylene groups, alkyl(hetero)arylene groups, alkylene(hetero)arylene groups, alkenylene(hetero)arylene groups and alkynylene(hetero)arylene groups are optionally substituted, and wherein the alkyl groups, alkenyl groups, alkynyl groups, alkylene groups, alkenylene groups, alkynylene groups, the alkyl parts of the (hetero)arylalkyl groups, alkyl(hetero)aryl groups and alkyl(hetero)arylene groups, the alkylene parts of the (hetero)arylalkylene groups and alkylene(hetero)arylene groups, the alkenylene parts of the alkenylene(hetero)arylene groups and the alkynylene parts of the alkynylene(hetero)arylene groups are optionally interrupted by one or more heteroatoms; and
optionally, when n≤2, two adjacent $R^2$ groups, together with the bonds connecting the two $R^2$ groups, form a cyclic alkyl group or a (hetero)aryl group, wherein the cyclic alkyl group and the (hetero)aryl group are optionally substituted.

The present invention further relates to a process for grafting a poly(arylsulfone), wherein, in the presence of an enzyme, a poly(arylsulfone) is reacted with a compound of the Formula (II):

wherein X, $R^1$, $R^2$, m and n are as defined above.

In addition, the invention relates to a poly(arylsulfone) obtainable by the process according to the invention.

The invention further relates to a polymer blend comprising a poly(arylsulfone) according to the invention and to a copolymer comprising a poly(arylsulfone) according to the invention.

The invention also relates to a membrane comprising a poly(arylsulfone) according to the invention.

Finally, the invention relates to the use of a poly(arylsulfone) according to the invention, or the membrane according to the invention, in a separation process.

DETAILED DESCRIPTION OF THE INVENTION

Definitions

The verb "to comprise" as is used in this description and in the claims and its conjugations is used in its non-limiting sense to mean that items following the word are included, but items not specifically mentioned are not excluded.

In addition, reference to an element by the indefinite article "a" or "an" does not exclude the possibility that more than one of the element is present, unless the context clearly requires that there is one and only one of the elements. The indefinite article "a" or "an" thus usually means "at least one".

Unsubstituted alkyl groups have the general formula $C_nH_{2n+1}$ and may be linear or branched. Unsubstituted alkyl groups may also contain a cyclic moiety, and thus have the concomitant general formula $C_nH_{2n-1}$. Optionally, the alkyl groups are substituted by one or more substituents further specified in this document, and/or interrupted by heteroatoms selected from the group of oxygen, nitrogen, and sulphur. Examples of suitable alkyl groups include methyl, ethyl, propyl, 2-propyl, t-butyl, 1-hexyl, 1-dodecyl, etc.

Unsubstituted alkenyl groups comprise one or more double bonds. Unsubstituted alkenyl groups comprising one double bond have the general formula $C_nH_{2n-1}$, and may be linear or branched. Unsubstituted alkenyl groups may also contain a cyclic moiety, and thus have the concomitant general formula $C_nH_{2n-3}$. Optionally, the alkenyl groups are substituted by one or more substituents further specified in this document, and/or interrupted by heteroatoms selected from the group of oxygen, nitrogen and sulphur. Examples of suitable alkenyl groups include ethenyl, propenyl, isopropenyl, butenyl, pentenyl, decenyl, etc.

Unsubstituted alkynyl groups comprise one or more triple bonds. Unsubstituted alkynyl groups comprising one double bond have the general formula $C_nH_{2n-3}$, and may be linear or branched. Unsubstituted alkynyl groups may also contain a cyclic moiety, and thus have the concomitant general formula $C_nH_{2n-5}$. Optionally, the alkynyl groups are substituted by one or more substituents further specified in this document, and/or interrupted by heteroatoms selected from the group of oxygen, nitrogen and sulphur. Examples of suitable alkynyl groups include propynyl, butyryl, cyclooctynyl, etc.

An aryl group comprises six to twelve carbon atoms and may include monocyclic and bicyclic structures. Optionally, the aryl group may be substituted by one or more substituents further specified in this document. Examples of aryl groups are phenyl and naphthyl.

A heteroaryl group comprises five to twelve carbon atoms wherein one to four carbon atoms are replaced by heteroatoms selected from the group consisting of oxygen, nitrogen, phosphorus and sulphur. A heteroaryl group may have a monocyclic or a bicyclic structure. Optionally, the heteroaryl group may be substituted by one or more substituents further specified in this document. Examples of suitable heteroaryl groups include pyridinyl, quinolinyl, pyrimidinyl, pyrazinyl, pyrazolyl, pyrrolyl, furanyl, benzofuranyl, indolyl, purinyl, benzoxazolyl, thienyl, phospholyl and oxazolyl.

Arylalkyl groups and alkylaryl groups comprise at least seven carbon atoms and may include monocyclic and bicyclic structures. Optionally, the arylalkyl groups and alkylaryl may be substituted by one or more substituents further specified in this document. An arylalkyl group is for example benzyl. An alkylaryl group is for example 4-t-butylphenyl.

Alkylenearylene groups comprise at least seven carbon atoms and may include monocyclic and bicyclic structures. Optionally, the alkylenearylene groups may be substituted by one or more substituents further specified in this document. Examples of an alkylenearylene group are —$CH_2$—$CH_2$—($C_6H_4$)— and —($C_6H_4$)—$CH_2$—$CH_2$—.

Alkenylenearylene groups comprise at least eight carbon atoms and may include monocyclic and bicyclic structures. Optionally, the alkenylenearylene groups may be substituted by one or more substituents further specified in this document. Examples of an alkenylenearylene group are —CH=CH—($C_6H_4$)— and —($C_6H_4$)—CH=CH—.

Alkynylenearylene groups comprise at least eight carbon atoms and may include monocyclic and bicyclic structures. Optionally, the alkynylenearylene groups may be substituted by one or more substituents further specified in this document. Examples of an alkynylenearylene group are —C≡C—($C_6H_4$)— and ($C_6H_4$)—C≡C—.

(Hetero)aryl groups comprise aryl groups and heteroaryl groups. Alkyl(hetero)aryl groups comprise alkylaryl groups and alkylheteroaryl groups. (Hetero)arylalkyl groups comprise arylalkyl groups and heteroarylalkyl groups. Alkylene(hetero)arylene groups comprise alkylenearylene groups and alkyleneheteroarylene groups. Alkenylene(hetero)arylene groups comprise alkenylenearylene groups and alkenyleneheteroarylene groups. Alkynylene(hetero)arylene groups comprise alkynylenearylene groups and alkynyleneheteroarylene groups.

Grafted poly(arylsulfone)

The present invention relates to a poly(arylsulfone) having an aryl group grafted with a covalently attached substituent of the Formula (I):

wherein:

m is 0-5;

n is 0-5;

p=0 and q=1, or p=1 and q=0;

X is O, S or NH;

$R^1$ is independently selected from an electron-donating group having a negative value for the para-Hammett substituent constant $\sigma_p$, $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups, $C_6$-$C_{12}$ alkyl(hetero)aryl groups, $C_1$-$C_{12}$ alkoxy groups, $C_2$-$C_{12}$ alkenyloxy groups and $C_2$-$C_{12}$ alkynyloxy groups, wherein the alkyl groups, alkenyl groups, alkynyl groups, (hetero)aryl groups, (hetero)arylalkyl groups, alkyl(hetero)aryl groups, alkoxy groups, alkenyloxy groups and $C_2$-$C_{12}$ alkynyloxy groups are optionally substituted, and wherein the alkyl groups, alkenyl groups, alkynyl groups, alkoxy groups, alkenyloxy groups, alkynyloxy groups and the alkyl part of (hetero)arylalkyl groups and alkyl(hetero)aryl groups are optionally interrupted by one or more heteroatoms;

$R^2$ is independently selected from halogen, —$YR^3$, —$R^4YR^3$, —$N(R^3)_2$, —$R^4N(R^3)_2$, —$C(Y)R^3$, —$R^4C(Y)R^3$, —$C(Y)YR^3$, —$R^4C(Y)YR^3$ and —$\{X_p[C_6(XH)_q(R^1)_m(R^2)_n]\}_r$, wherein $R^1$, $R^2$, X, m, n, p and q are as defined above, wherein r is 1-200, wherein Y is O or S, wherein $R^3$ is independently selected from hydrogen, $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups and $C_6$-$C_{12}$ alkyl(hetero)aryl groups, wherein $R^4$ is independently selected from $C_1$-$C_{12}$ alkylene groups, $C_2$-$C_{12}$ alkenylene groups, $C_2$-$C_{12}$ alkynylene groups, $C_5$-$C_{12}$ (hetero)arylene groups, $C_6$-$C_{12}$ (hetero)arylalkylene groups, $C_6$-$C_{12}$ alkyl(hetero)arylene groups, $C_6$-$C_{12}$ alkylene(hetero)arylene groups, $C_7$-$C_{12}$ alkenylene(hetero)arylene groups, $C_7$-$C_{12}$ alkynylene(hetero)arylene groups, wherein the alkyl groups, alkenyl groups, alkynyl groups, (hetero)aryl groups, (hetero)arylalkyl groups, alkyl(hetero)aryl groups, alkylene groups, alkenylene groups, alkynylene groups, (hetero)arylene groups, (hetero)arylalkylene groups, alkyl(hetero)arylene groups, alkylene(hetero)arylene groups, alkenylene(hetero)arylene groups and alkynylene(hetero)arylene groups are optionally substituted, and wherein the alkyl groups, alkenyl groups, alkynyl groups, alkylene groups, alkenylene groups, alkynylene groups, the alkyl parts of the (hetero)arylalkyl groups, alkyl(hetero)aryl groups and alkyl(hetero)arylene groups, the alkylene parts of the (hetero)arylalkylene groups and alkylene(hetero)arylene groups, the alkenylene parts of the alkenylene(hetero)arylene groups and the alkynylene parts of the alkynylene(hetero)arylene groups are optionally interrupted by one or more heteroatoms; and optionally, when n≥2, two adjacent $R^2$ groups, together with the bonds connecting the two $R^2$ groups, form a cyclic alkyl group or a (hetero)aryl group, wherein the cyclic alkyl group and the (hetero)aryl group are optionally substituted.

With the term "a poly(arylsulfone) according to the invention", a grafted poly(arylsulfone) wherein one or more aryl groups of the poly(arylsulfone) backbone are grafted with a covalently attached substituent of the Formula (I) is meant.

The nature of the poly(arylsulfone) backbone of which an aryl group is grafted with a covalently attached substituent of the Formula (I) is described below in more detail. In a preferred embodiment the poly(arylsulfone) having an aryl group grafted with a covalently attached substituent of the Formula (I) is a polyethersulfone (PES), a polysulfone (PSF) or a polyphenylsulfone (PPSF).

A substituent of the Formula (I) is covalently attached to an aryl group of the poly(arylsulfone) backbone. Said covalent attachment may occur in different ways, depending on the nature of the substituent. Attachment may occur via a C—C bond between a C-atom of the poly(arylsulfone) aryl group and a C-atom of the aryl group of the substituent of the Formula (I), in which case p is 0 and q is 1 (C-linkage). Alternatively, the substituent of the Formula (I) may be bonded via a C—X bond between a C-atom of the poly(arylsulfone) aryl group and an X-atom of the substituent of the Formula (I), and in this case, p is 1 and q is 0 (X-linkage). A combination of X-linkage and C-linkage within a poly(arylsulfone) chain may also occur. Furthermore, even if there is a preference for C-linking (i.e. when p is 0 and q is 1), the presence of a minor amount of X-linking is not excluded, and vice-versa. In one embodiment of the poly(arylsulfone) according to the invention, p is 1 and q is 0. In another embodiment, p is 0 and q is 1.

Examples of the structure of a poly(arylsulfone) according to the invention, with (A) p is 1 and q is 0, (B) p is 0 and q is 1 and (C) a combination of X-linkage and C-linkage, are presented below. In these structures, a polyethersulfone (PES) is shown as the poly(arylsulfone) backbone of which an aryl group is grafted with a covalently attached substituent of the Formula (I).

(A): X-linkage, with p = 1 and q = 0

(B): C-linkage, with p = 0 and q = 1

(C): Combination of C-linkage and X-linkage

In these structures (A), (B) and (C), the substituents of the Formula (I) are present in the meta-position with respect to the sulfonyl groups. However, the presence of substituents on the ortho-position with respect to the sulfonyl groups is not excluded. Generally, the preferred position of the substituents may depend on the nature of the poly(arylsulfone) backbone and/or on the nature of the substituent of the Formula (I).

Poly(arylsulfones) may comprise different types of aryl groups in the backbone. For example, an aryl group may be bordered by both a sulfonyl group and an ether group, or by an ether group and e.g. an alkyl group or an aryl group. If the poly(arylsulfone) comprises an additional connecting unit wherein an aryl group is present, the aryl group of the additional connecting unit may be bordered by e.g. two aryl groups, two alkyl groups, or a combination of an alkyl group and an aryl group.

When the poly(arylsulfone) having an aryl group grafted with a covalently attached substituent of the Formula (I) is a poly(arylsulfone) comprising different types of aryl groups in the backbone, such as for example a polysulfone or a poly(phenylsulfone), the substituents may be present on each different type of aryl group of the poly(arylsulfone).

The number of substituents of the Formula (I) that is present in the poly(arylsulfone) according to the invention may vary widely. A poly(arylsulfone) according to the invention comprises a minimum of one aryl group that is grafted with a covalently attached substituent of the Formula (I). Theoretically, the maximum number of substituents is present when each aryl group of the poly(arylsulfone) according to the invention is grafted with a substituent. However, in practice such a high number of substituents is generally not necessary or not feasible. Generally, about 60% of the aryl groups of a poly(arylsulfone) according to the invention may be grafted with a covalently attached substituent of the Formula (I).

The substitution grade is defined as the average number of aryl groups in a poly(arylsulfone) according to the invention that is grafted with a substituent of the Formula (I), relative to the average total number of aryl groups present in the backbone of said poly(arylsulfone). In other words, if for example a poly(arylsulfone) according to the invention comprises about 1000 aryl groups in the backbone, and about 20 of these aryl groups are grafted with a substituent of the Formula (I), the substitution grade will be about 2%. In determining the average total number of aryl groups in the poly(arylsulfone) backbone, the aryl groups comprised in the substituents of the Formula (I) are not taken into account.

In general, the substitution grade is in the range of about 0.01 to about 60%, preferably in the range of about 0.03 to about 50%, more preferably in the range of about 0.05 to about 40% and in particular in the range of 0.1 to about 30%.

The number average molecular weight of the grafted poly(arylsulfone) according to the invention may be in the range of about 3000 to about 1700000 g/mol, preferably in the range of about 4000 to about 1000000 g/mol, more preferably in the range of about 5000 to about 500000 g/mol, and most preferably in the range of about 10000 to about 200000 g/mol.

X may be O, S or NH. In a preferred embodiment, X is O.

The substituent of the Formula (I) may comprise up to five R' groups (m is 0-5). The $R^1$ groups may be independently selected. Hence, if the substituent of the Formula (I) comprises for example $3R^1$ groups, each of these $R^1$ groups may be different from the others.

In one embodiment, $R^1$ may be selected from the group comprising electron donating groups, i.e. groups with a negative value for the para-Hammett substituent constant $\sigma_p$. Groups with a negative value for $\sigma_p$ include for example amine groups, hydroxyl groups, alkyl groups, aryl groups, cycloalkyl groups, alkenyl groups, alkoxy groups, alkenyloxy groups and trimethylsilyl groups. para-Hammett substituent constants $\sigma_p$ are known for a large number of substituents (see for example C. Hansch et al., Chem. Rev. 1991, 91, 165-195, incorporated by reference).

$R^1$ may also be selected from the group consisting of $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups, $C_6$-$C_{12}$ alkyl(hetero)aryl groups, $C_1$-$C_{12}$ alkoxy groups, $C_2$-$C_{12}$ alkenyloxy groups and $C_2$-$C_{12}$ alkynyloxy groups, wherein the alkyl groups, alkenyl groups, alkynyl groups, (hetero)aryl groups, (hetero)arylalkyl groups, alkyl(hetero)aryl groups, alkoxy groups, alkenyloxy groups and $C_2$-$C_{12}$ alkynyloxy groups are optionally substituted, and wherein the alkyl groups, alkenyl groups, alkynyl groups, alkoxy groups, alkenyloxy groups, alkynyloxy groups and the alkyl part of (hetero)arylalkyl groups and alkyl(hetero)aryl groups are optionally interrupted by one or more heteroatoms, preferably O, S and/or N.

In a preferred embodiment, m is 0. In another preferred embodiment, m is 1, 2, 3 or 4, more preferably 1 or 2. Preferably, one or more $R^1$ group is a hydroxyl group or an alkoxy group, more preferably a hydroxyl group or a methoxy group. In a further preferred embodiment, m is 1 or 2 and one or more $R^1$ group is a hydroxyl group or a methoxy group.

The substituent of the Formula (I) may comprise up to five independently selected $R^2$ groups (n is 0-5). Preferably, n is 1, 2 or 3.

An $R^2$ group may for example serve as an anchor for the attachment of additional substituents to the substituents of the Formula (I). Since an electron donating group according to the definition of $R^1$ may also be used as a handle for further substitution, the definition of $R^2$ partly overlaps the definition of $R^1$.

In one embodiment, $R^2$ is independently selected from halogen, —$YR^3$, —$R^4YR^3$, —$N(R^3)_2$, —$R^4N(R^3)_2$, —$C(Y)R^3$, —$R^4C(Y)R^3$, —$C(Y)YR^3$, —$R^4C(Y)YR^3$ and —$\{X_p[C_6(XH)_q(R^1)_m(R^2)_n]\}_r$, wherein $R^1$, $R^2$, X, m, n, p and q are as defined above, wherein r is 1-200, wherein Y is O or S, wherein $R^3$ is independently selected from hydrogen, $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups and $C_6$-$C_{12}$ alkyl(hetero)aryl groups, wherein $R^4$ is independently selected from $C_1$-$C_{12}$ alkylene groups, $C_2$-$C_{12}$ alkenylene groups, $C_2$-$C_{12}$ alkynylene groups, $C_5$-$C_{12}$ (hetero)arylene groups, $C_6$-$C_{12}$ (hetero)arylalkylene groups, $C_6$-$C_{12}$ alkyl(hetero)arylene groups, $C_6$-$C_{12}$ alkylene(hetero)arylene groups, $C_7$-$C_{12}$ alkenylene(hetero)arylene groups, $C_7$-$C_{12}$ alkynylene(hetero)arylene groups, wherein the alkyl groups, alkenyl groups, alkynyl groups, (hetero)aryl groups, (hetero)arylalkyl groups, alkyl(hetero)aryl groups, alkylene groups, alkenylene groups, alkynylene groups, (hetero)arylene groups, (hetero)arylalkylene groups, alkyl(hetero)arylene groups, alkylene(hetero)arylene groups, alkenylene(hetero)arylene groups and alkynylene(hetero)arylene groups are optionally substituted, and wherein the alkyl groups, alkenyl groups, alkynyl groups, alkylene groups, alkenylene groups, alkynylene groups, the alkyl parts of the (hetero)arylalkyl groups, alkyl(hetero)aryl groups and alkyl(hetero)arylene groups, the alkylene parts of the (hetero)arylalkylene groups and alkylene(hetero)arylene groups, the alkenylene parts of the alkenylene(hetero)arylene groups and the alkynylene parts of the alkynylene(hetero)arylene groups are optionally interrupted by one or more heteroatoms, preferably O, S and/or N.

The $R^2$ groups may be independently selected, hence if a substituent of the Formula (I) comprises for example two $R^2$ groups, one $R^2$ group may be different from the other. Also the $R^3$ groups may be selected independently, meaning that the two $R^3$ groups present in for example a —$N(R^3)_2$ group may be different from each other.

Preferably, $R^2$ is selected from the group comprising —$C(O)OR^3$, —$R^4C(O)OR^3$, —$N(R^3)_2$, —$OR_3$ and —$SR^3$, wherein $R^3$ and $R^4$ are as defined above. Preferably, $R^3$ is independently selected from H, $C_1$-$C_{12}$ alkyl groups, $C_6$-$C_{12}$ (hetero)aryl groups, $C_7$-$C_{12}$ (hetero)arylalkyl groups and $C_7$-$C_{12}$ alkyl(hetero)aryl groups. Preferably, $R^4$ is a $C_2$-$C_{12}$ alkenylene group or a $C_7$-$C_{12}$ alkenylene(hetero)arylene group, in particular a —C($R^3$)═C($R^3$)— group or a —C($R^3$)═C($R^3$)($C_6H_4$)— group.

In a preferred embodiment, $R^2$ is C(O)OH, —C($R^3$)═C($R^3$)C(O)OH or —C($R^3$)═C($R^3$){$C_6H_4$(C(O)OH)}.

In another embodiment, $R^2$ is —{$X_p$[$C_6$(XH)$_q$($R^1$)$_m$($R^2$)$_n$]}$_r$, wherein $R^1$, $R^2$, X, m, n, p and q are as defined above, and wherein r is 1-200. In other words, in this oligomeric and/or polymeric substitution, up to 200 compounds of the Formula (II) (see below) may be linked to form a substituent of the Formula (I). Optionally, a substituent of the Formula (I) is composed of two or more different compounds of the Formula (II). The r-value of a substituent of the Formula (I) may differ for each substituent within a poly(arylsulfone) chain.

In one embodiment p is 1 and q is 0 (X-linkage, see above), and in another embodiment p is 0 and q is 1 (C-linkage, see above). In a third embodiment, a combination of C-linkage and X-linkage occurs. An example of a poly(arylsulfone) according to the invention wherein a substituent of the Formula (I) comprises an $R^2$ group corresponding to —{$X_p$[$C_6$(XH)$_q$($R^1$)$_m$($R^2$)$_n$]}$_r$, is shown below: the poly(arylsulfone) is a polyethersulfone, X is O, n is 1, and $R^2$ is —C(O)OH. Structure (D) shows X-linked oligomeric substitution with p is 1 and q is 0, and structure (E) shows C-linked oligomeric substitution with p is 0 and q is 1. In the structures shown, m may for example equal 1 or 2 and the one or two $R^1$ groups may be —OH groups. In the specific structure shown here wherein X is O, the substituent of the Formula (I) may have a preference for O-linkage (D).

(D): X-linkage (X = O), with p = 1 and q = 0

(E): C-linkage, with p = 0 and q = 1

In a preferred embodiment, the poly(arylsulfone) according to the invention is a poly(arylsulfone) wherein X is O. In another preferred embodiment, m is 1 or 2. More preferably, the one or two $R^1$ groups are —OH and/or —OMe. In yet another preferred embodiment, n is 1. Preferably $R^2$ is —C(O)OH.

In yet another embodiment, optionally, when n≥2, two adjacent $R^2$ groups, together with the bonds connecting the two $R^2$ groups, form a cyclic alkyl group or a (hetero)aryl group, wherein the cyclic alkyl group and the (hetero)aryl group are optionally substituted. As will be clear to a person skilled in the art, the position of the cyclic alkyl group or (hetero)aryl group is determined by the position of the two adjacent $R^2$ groups. In a preferred embodiment, the two adjacent $R^2$ groups form a (hetero)aryl group, preferably a $C_6$-aryl group. An example wherein two adjacent $R^2$ groups form a $C_6$-aryl group together with the bonds connecting the two $R^2$ groups is shown below. In structures (F) and (G) the substituent of the Formula (I) is a naphthyl substituent. The substituents on the cyclic alkyl group or the (hetero)alkyl group are defined as $R^1$ and $R^2$ above. As will be clear to the person skilled in the art, the definitions for m' and n' (see structures (F) and (G)) depend on the nature of the cyclic alkyl group or the (hetero)alkyl group. In structures (F) and (G), m' may be 0, 1, 2, 3 or 4 and n' may be 0, 1, 2, 3 or 4.

Process for Grafting a poly(arylsulfone)

The invention also relates to a process for grafting a poly(arylsulfone), wherein, in the presence of an enzyme, a poly(arylsulfone) is reacted with a compound of the Formula (II):

wherein X, $R^1$, $R^2$, m and n are as defined above.

The compound of the Formula (II) is a (substituted) phenol, a (substituted) thiophenol or a (substituted) aniline, i.e. X is O, S or NH. Optionally, one or more substituents $R^1$ and/or one or more substituents $R^2$ are present. When X is S, suitable compounds of the Formula (II) include (substituted) mercaptophenols. Examples with X is NH include for example (substituted) phenylamines such as p-aminophenol, 1,4-diaminobenzene and p-aminobenzoic acid.

In a preferred embodiment, X is O. Preferably m is 0, 1, 2, 3 or 4, more preferably 1 or 2. $R^1$ is preferably a hydroxyl group or an alkoxy group. Preferably, n is 1, 2 or 3. $R^2$ is preferably selected from the group comprising —C(O)$R^3$, —$R^4$C(O)O$R^3$, —N($R^3$)$_2$, —O$R_3$ and —S$R^3$, wherein $R^3$ and $R^4$ are as defined above. In a preferred embodiment, the compound of the Formula (II) is selected from the group comprising phenolic acids and substituted phenolic acids. Preferably, $R^2$ is —C(O)OH, —C($R^3$)=C($R^3$)C(O)OH or —C($R^3$)=C($R^3$){$C_6H_4$(C(O)OH)}.

In a further preferred embodiment, the compound of the Formula (II) is 4-hydroxybenzoic acid, ferulic acid or gallic acid.

In a preferred embodiment, the enzyme is selected from the group of oxidoreductases (classified as EC 1). In a further preferred embodiment, the enzyme is a laccase, a tyrosinase, a polyphenol oxidase, a peroxidase, or a combination thereof. Preferably, the enzyme concentration is in the range of 0.01-10 U·ml$^{-1}$, more preferably in the range of 0.05-5 U·ml$^{-1}$, even more preferably in the range of 0.07-1 U·ml$^{-1}$ and most preferably in the range of 0.1-0.5 U·ml$^{-1}$.

The process according to the reaction is executed in a solvent. Water is preferred as a solvent, but also the use of a mixture of water with a water-miscible or a water-immiscible solvent may be advantageous. Suitable water-miscible solvents include, amongst others, alcohols (for example methanol, ethanol, 1-propanol, 2-propanol, t-butanol, diols such as 1,2-ethanediol, 1,3-propanediol, polyethylene glycol, triols such as glycerol), monoglyme, diglyme, triglyme, acetone, tetrahydrofuran, and acetonitrile. Suitable water-immiscible solvents include, amongst others, ethyl acetate, toluene, diisopropyl ether, alkanes, vegetable oils, and fatty acids.

The process according to the invention may be executed at a very broad pH range. As will be clear to a person skilled in the art, the optimum pH at which the process is preferably executed depends, amongst others, on the enzyme used in that specific process. For example, some suitable laccases may have an optimum pH of 2, whereas other suitable laccases may have their optimum at a pH of 12. However, an enzyme may still have good activity at a pH that is quite different from its optimum pH. In addition, the nature of the poly(arylsulfone) to be grafted and the compound of the Formula (II) may be of influence on the optimum pH for that specific process. The process according to the invention is preferably executed at a pH in the range of about 2 to about 12, more preferably in the range of about 3 to about 10, even more preferably at a pH of about 4 to about 8, and most preferably at a pH of about 4 to about 7.

Also the temperature range at which the process of the invention may be executed is very broad. For example, an enzyme may have a certain optimum temperature, but still have a satisfactory activity at a lower or a higher temperature. The optimum temperature for a specific grafting process depends on the nature of that grafting process. In a preferred embodiment, the temperature is in the range of about 0° C. to about 100° C., preferably in the range of about 10° C. to about 60° C. and more preferably in the range of about 15° C. to about 50° C. Most preferably, the process is executed without additional heating or cooling, i.e. at ambient temperature, usually a temperature in the range of about 15° C. to about 30° C.

In a preferred embodiment, the pH is about 4 to about 8 and the temperature is in the range of about 10° C. to about 60° C.

The poly(arylsulfone) that is grafted according to the invention may be any type of poly(arylsulfone). As was described above, poly(arylsulfones) may for example be prepared via reaction of 4,4'-dichlorodiphenylsulfone with a bisphenol, whereby a different type of poly(arylsulfone) may be obtained by using a different bisphenol in the reaction. The poly(arylsulfone) that is grafted according to the process of the invention may be any aromatic poly(arylsulfone) comprising sulfone units, ether units and aryl units in the repeating unit. Furthermore, any additional connecting units may be present in the repeating unit. Examples of connecting units include methylene groups, isopropylene groups (such as in polysulfone), perfluoroisopropylene groups, phenylene groups, thioether groups, carbonyl groups, and the like. Suitable types of poly(arylsulfones) and bisphenols for the preparation thereof are for example disclosed in US 2010/0086716, incorporated by reference. In a preferred embodiment, the poly(arylsulfone) that is grafted according to the process of the invention is a polyethersulfone (PES), a polysulfone (PSF) or a polyphenylsulfone (PPSF).

The poly(arylsulfone) that is grafted according to the invention may be porous or non-porous, and it may be in any form, such as for example in the form of a powder, a membrane, or a shaped article (e.g. a pellet, a sheet, a tube, a fiber). In addition, the poly(arylsulfone) may be part of a copolymer (for example a block-copolymer), or be a component of a polymer blend. Examples of a blend comprising a poly(arylsulfone) include blends of a poly(arylsulfone) with PVP, PEG or PEO, PPO, PEEK, SPEEK, PVDF, PDMS, polyelectrolytes, one or more other poly(arylsulfones) such as for example sulfonated polyethersulfone (SPES), or with a poloxamer (also known under the tradename Pluronics®). Examples of a copolymer comprising a poly(arylsulfone) include copolymers of PES or PSF and PEG or PEO, PPO, PEEK, SPEEK, PVDF or PDMS.

As will be clear to a person skilled in the art, the grafting process according to the invention may take place on the surface of the poly(arylsulfone). When the poly(arylsulfone) that is grafted is a porous poly(arylsulfone) such as for example a (porous) membrane or a part of a (porous) membrane, the grafting may also take place inside the pores of the membrane. In one embodiment, the poly(arylsulfone) that is grafted according to the invention is a membrane. The membrane may be any kind of membrane, for example a dense, a porous or an asymmetric membrane. Said membrane may be microporous, mesoporous or macroporous. The membrane may for example be a flat sheet membrane, as used in plate and frame modules (such as a spiral membrane or a pillow-shaped membrane), a tubular membrane (such as a capillary membrane, a hollow fibre membrane or a tubular membrane), or any other suitable type of membrane known in the art.

The number average molecular weight of the poly(arylsulfone) that is grafted according to the process of the invention may be in the range of about 3000 to about 1000000 g/mol, preferably in the range of about 4000 to about 500000 g/mol, more preferably in the range of about 5000 to about 300000 g/mol, and most preferably in the range of about 10000 to about 100000 g/mol.

In the process according to the invention, an aryl group of the poly(arylsulfone) is grafted via reaction of said poly(arylsulfone) with a compound of the Formula (II).

The concentration of the compound of the Formula (II) is in the range of 0.1-200 mM, more preferably 0.1-100 mM, even more preferably 0.3-50 mM, and most preferably 0.5-30 mM.

In case of oligomeric and/or polymeric substitution as shown in structures (D) and (E), the grafting of the first compound of the Formula (II) on an aryl group of the poly(arylsulfone) may be the first step. Further reaction of the grafted substituent with the compound of the Formula (II) may then result in oligomeric and/or polymeric substitution, wherein up to 200 compounds of the Formula (II) may be linked to form a substituent of the Formula (I) (r is 1-200). Optionally, the process according to the invention is executed in the presence of two or more different compounds of the Formula (II), and therefore a substituent of the Formula (I) may be composed of two or more different compounds of the Formula (II).

The invention also relates to a poly(arylsulfone) obtainable by the process according to the invention.

Applications

The grafted poly(arylsulfones) according to the invention, i.e. a poly(arylsulfone) having an aryl group grafted with a covalently attached substituent of the Formula (I), are very suitable materials for the application in membranes. The presence of the substituents of the Formula (I) renders a poly(arylsulfone) according to the invention more hydrophilic, and therefore less prone to fouling, in particular protein fouling. In addition, the steric bulk of the substituents may have an advantageous effect in reducing and/or preventing fouling of the membrane. It was shown that the liquid flux of a membrane comprising a poly(arylsulfone) according to the invention was hardly influenced, in spite of the presence of a substantial and stable grafted layer. This opens a range of application possibilities for said membranes.

Therefore, the invention also relates to a membrane comprising a poly(arylsulfone) according to the invention. The membrane according to the invention may be any kind of membrane, for example a dense membrane, a porous membrane or an asymmetric membrane. Furthermore, the membrane may be a microporous (dp<2 nm) membrane, a mesoporous (2 nm<dp<50 nm) membrane or a macroporous (dp>50 nm) membrane. The membrane may for example be a flat sheet membrane, as used in plate and frame modules (such as a spiral membrane or a pillow-shaped membrane), a tubular membrane (such as a capillary membrane, a hollow fibre membrane or a tubular membrane), or any other suitable type of membrane known in the art.

The invention further relates to the use of a poly(arylsulfone) according to the invention, or the membrane according to the invention, in a separation process.

Examples of a separation process are for example all kinds of filtrations such as microfiltration, nanofiltration, ultrafiltration, reverse osmosis, dialysis (see for example Kirk-Othmer, "Encyclopedia of Chemical Technology", John Wiley & Sons, $4^{th}$ Ed. 1993, Volume 8, p. 58-74 or U.S. Pat. No. 5,762,798, both incorporated by reference), and so on. Examples of such separation processes include the separation of micro organisms from liquids (for example the cold sterilisation of fruit juice, the clarification of for example wine and fruit juice, the separation of brewer's yeasts from beer, etc.), separation of proteins (for example separation of milk proteins or the work-up of a fermentation liquid, etc.) or water filtration applications (see for example U.S. Pat. No. 5,762,798, incorporated by reference).

A grafted poly(arylsulfone) according to the invention may be used in a number of additional applications. As will be clear to a person skilled in the art, applications wherein the hydrophobicity of a conventional poly(arylsulfone) is disadvantageous, may benefit from the more hydrophilic grafted poly(arylsulfone) according to the invention.

The invention therefore also relates to a composition comprising a grafted poly(arylsulfone) according to the invention and one or more additional polymers, such as for example a polymer blend comprising a poly(arylsulfone) according to the invention. An example of a blend comprising a poly(arylsulfone) is a polyethersulfone/polyvinyl-pyrrolidone (PES/PVP) blend. Other examples include blends of a poly(arylsulfone) with polyethylene glycol (PEG), poly(ethylene oxide) (PEO), poly(propylene oxide) (PPO), a poloxamer, i.e. a block-copolymer of poly(propylene oxide) and poly(ethylene oxide) (poloxamers are also known under the trade name Pluronics®), poly(ether ether ketone) (PEEK), a sulfonated poly(ether ether ketone) (SPEEK), polyvinylidene fluoride (PVDF), polydimethylsiloxane (PDMS), polyelectrolytes, and/or another poly(arylsulfone), such as for example sulfonated polyethersulfone (SPES).

In addition, the invention relates to a copolymer, in particular a block-copolymer, comprising a poly(arylsulfone) according to the invention. Examples of copolymers comprising a poly(arylsulfone) include copolymers of PES or PSF and PEO, PEG, PPO, PEEK, SPEEK, PVDF or PDMS.

The invention also relates to a membrane comprising a polymer blend according to the invention or a copolymer according to the invention.

EXAMPLES

Materials and Methods

Chemicals

Gallic acid was obtained from Sigma Aldrich (>97.5%). 4-Hydroxybenzoic acid (99%) was purchased from Alfa Aesar. Ferulic acid (>98%) and catechol (>99%) were obtained from Fluka. From the same supplier, sodium acetate (anhydrous, ≥99%), and acetic acid (99.9%) were purchased. 2,2'-Azobis(3-ethylbenzothiazoline-6-sulphonic acid) (ABTS) was from Calbiochem. Dichloromethane (DCM) (liquid chromatography gradient grade) was purchased from Merck. N,N-dimethylformamide-$d_7$ (NMR solvent, DMF-$d_7$) was kindly supplied by Wageningen NMR center. Flat sheet commercial polyethersulfone membranes were purchased from Sartorius (symmetric, 0.2 μm pore size, 50 mm diameter, 150 mm thickness, water flow rate>28 ml·min$^{-1}$·cm$^2$ at ΔP=1 bar). Laccase from *Trametes versicolor* (22.4 U·mg$^{-1}$) was obtained from Fluka. All chemicals were used as received.

Color Measurements

CIELAB coordinates for the modified membranes were measured with a ColorFlex (Hunter Lab, CIE L*, a*, b*, CIE L*, C*, h* at D 65/10°). The color values L* (lightness), a* (red-green axes), b* (yellow-blue axes), and ΔC* were determined. ΔC* (color saturation), is a characteristic parameter indicating the vibrancy or intensity of a color, the color with high saturation will appear more intense than the same color with less saturation. ΔE* is the degree of color change, which is calculated from $[(L^*)^2+(a^*)^2+(b^*)^2]^{0.5}$.

XPS Analysis

A JEOL JPS-9200 X-ray Photoelectron Spectrometer (Japan) is used for surface analysis of the elemental composition of the modified membranes to a depth of around 10 nm. The minimum X-ray spot size is 30 microns. The high-resolution spectra were obtained under UHV conditions using monochromatic Al Kα X-ray radiation at 12 kV and 25 mA, using an analyzer pass-energy of 10 eV. All high-resolution spectra were corrected with a linear background before fitting.

Pure Water Flux and Membrane Hydraulic Resistance ($R_m$)

A dead-end stirred filtration cell (Millipore, Model 8050, active transport area 13.4 cm$^2$) was used to characterize the filtration performance of virgin and modified membranes. Pure water flux was measured at a constant trans-membrane pressure of 1 bar at 24±1° C. and 300 rpm. The pure water flux is calculated with[44]:

$$Q = \frac{J_w}{\Delta t \cdot A}$$

wherein Q is the quantity of permeate collected (m$^3$), $J_w$ is water flux (m$^3$·m$^{-2}$·s$^{-1}$), Δt is the sampling time (s), and A is the membrane area (m$^2$).

To determine the hydraulic resistance of the membrane ($R_m$), the pure water flux was measured at different trans-membrane pressures, 0.2, 0.4, 0.6, 0.8, 1, and 1.2 bar. The resistance of the membrane follows from the slope of water flux versus transmembrane pressure.

Grafting Yield

The amount of phenolic acid grafted onto the membrane surface is calculated from the weight of the membrane, before and after grafting, and the grafting yield is expressed as the weight increase relative to the initial weight.

Water Uptake

The membrane samples were immersed in deionized water for 24 hr at 24±1° C. and then the sample surfaces were dried by wiping with filter paper and weighed (wet weight). The membrane samples were dried in an oven at 120° C. for 24 hours, left to cool in desiccator and then weighed (dry weight). Water uptake is calculated from the difference between the two weights relative to the wet weight.

SEM

The membranes prepared under different conditions were imaged in a scanning electron microscope (Joel Jsm 6360LA, Japan). The membrane samples were coated with Au/Pt. ×1500, ×5000, and ×15000 magnifications are shown.

Example 1

Laccase Assay

Laccase activity was determined with 2,2'-azobis(3-ethylbenzothiazoline-6-sulphonic acid) (ABTS) as substrate. The assay mixture contained 0.33 mL of 1 M ABTS solution, 2.67 mL of 0.1 M sodium acetate buffer (pH 5), with 0.05 U·ml$^{-1}$ laccase. Oxidation of ABTS is monitored by following the increase in absorbance at 420 nm (ε=36,000 M$^{-1}$·cm$^{-1}$). One unit of laccase activity is defined as the amount of enzyme required to oxidize 1 μmol of ABTS per min at 25° C. The reaction time is taken at 1 minute. Another activity assay was carried out with catechol as substrate. The assay mixture contained 0.33 mL of 10 mM catechol solution, 2.67 mL of 0.1 M sodium acetate buffer (pH 5), with 0.025 U·ml$^{-1}$ laccase. Oxidation of catechol is monitored by following the increase in absorbance at 400 nm (ε=26,000 M$^{-1}$·cm$^{-1}$). One unit of laccase activity is defined as the amount of enzyme required to oxidize 1 mmol of catechol per min at 25° C. The reaction time is 20 minutes. The apparent kinetic parameters $K_m$ and $V_{max}$ were determined by fitting the initial reaction rate (v) and substrate concentration [for ABTS $K_m$=258 mM & $V_{max}$=455·10$^{-3}$ mM·min$^{-1}$ and for catechol $K_m$=8.4 mM & $V_{max}$=50.3·10$^{-3}$ mM·min$^{-1}$]. These values are comparable to the values found for fungal laccases.

Example 2

Enzyme and Substrate Adsorption Tests (Blank Tests)

The interaction of the monomers of the formula (II) and the virgin polyethersulfone (PES) membrane in the absence of enzyme was tested. A virgin membrane sample was incubated in 40 ml 0.1 M sodium acetate buffer (pH 5, 24±1° C.) containing 1 U·ml$^{-1}$ enzyme in the absence of phenolic acid substrate, for 24 hours. The amount of adsorbed enzyme was calculated from the weight difference. The same test was performed with the monomer solution (without enzyme).

The results showed that no notable reaction occurred between PES membrane and any of the tested monomers. The color of the membrane did not change and the weight remained constant after 24 hr incubation time. When enzyme was incubated with the membrane in the absence of substrate, it was found that enzyme adsorption did take place on the PES membrane surface (3.43 mg·g$^{-1}$ PES), but this did not lead to coloration or any other change of the membrane.

Example 3

Membrane Modification Experiments

Flat membranes were incubated in 40 ml 0.1 M sodium acetate buffer (pH 5) containing different concentrations of phenolic acids of the Formula (II) (monomers) and enzyme. The samples were gently shaken, and after a specific incubation time, they were removed from the liquid. Ferulic acid, gallic acid, and 4-hydroxybenzoic acid were tested, at concentrations ranging from 0.6 to 28.8 mM and incubation times ranging from 15 minutes to 24 hours. The enzyme concentrations tested were 0.1 and 0.5 U·ml$^{-1}$. Once the incubation time was completed, the membranes were washed by strong flushing with water, repeated dipping in Milli-Q water and subsequent decantation. The modified membranes were kept in glass-covered dishes in desiccators for drying.

Figure 1:
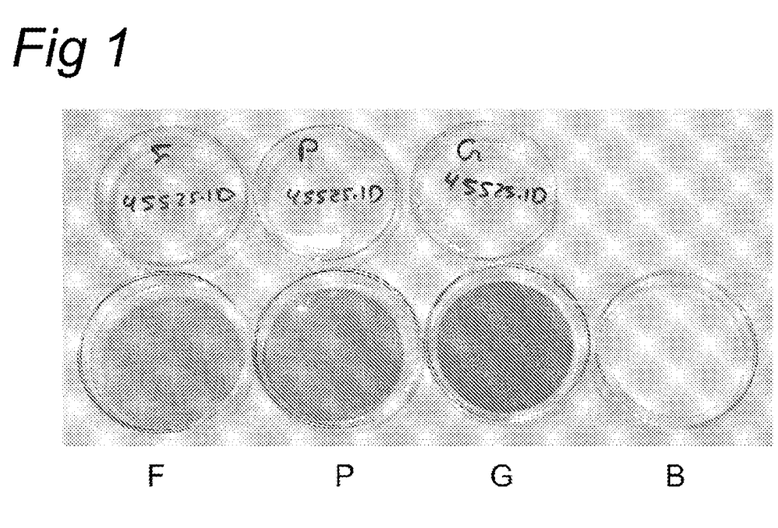
FIG. 1 depicts the color changes of modified polyethersulfone membranes after washing, indicating the covalent binding of the substituents to the polyethersulfone ((F) grafting with ferulic acid, (P) grafting with p-hydroxybenzoic acid, (G) grafting with gallic acid, and (B) blank membrane without grafting).

Incubation of the membrane with laccase and the monomers led to visual changes, as is illustrated in FIG. 1. FIG. 1 shows a blank (virgin) PES membrane (B), and modified PES membranes after washing, the PES modified with ferulic acid (F), p-hydroxybenzoic acid (P) and gallic acid (G). The reaction conditions were 28.8 mM substrate, 0.5 U·ml$^{-1}$ enzyme, 0.1 M sodium acetate buffer pH 5.0, 24 h incubation time, 24° C. The color changes of the modified membranes in (F), (P) and (G) are indicative of covalent binding of the monomer to the PES. The resulting extended π-system gives rise to the observed color change.

The lightness (L*), color saturation (ΔC*), and degree of total change of color (ΔE*) for several PES membranes modified with ferulic acid or p-hydroxybenzoic acid at various monomer concentrations and incubation times, as analysed by CIELAB, are shown in Table 1 (25° C., pH 5 (0.1 M sodium acetate buffer) and 0.5 U·ml$^{-1}$ enzyme concentration).

TABLE 1

Lightness (L*), color saturation (ΔC*), and degree of total change of color (ΔE*) response determined by CIELAB, at various monomer concentrations and incubation times.

| Monomer | c (mM) | t (h) | L* | ΔC* | ΔE* |
|---|---|---|---|---|---|
| Virgin membrane | — | — | 100.94 | 0.00 | 0.00 |
| Ferulic acid | 0.6 | 8 | 97.09 | 6.71 | 8.95 |
| Ferulic acid | 0.6 | 24 | 93.89 | 10.70 | 13.99 |
| Ferulic acid | 10 | 8 | 96.59 | 6.72 | 9.19 |
| Ferulic acid | 10 | 24 | 94.29 | 7.86 | 11.36 |
| 4-hydroxybenzoic acid | 0.6 | 8 | 99.16 | 2.53 | 4.29 |
| 4-hydroxybenzoic acid | 0.6 | 24 | 97.34 | 4.24 | 6.67 |
| 4-hydroxybenzoic acid | 10 | 8 | 96.14 | 4.77 | 7.88 |
| 4-hydroxybenzoic acid | 10 | 24 | 94.18 | 6.85 | 10.65 |

Obviously, the lowest ΔE* value, and therefore the highest L*, was obtained for the virgin membrane. For membranes grafted with ferulic acid the ΔE* value increased with increasing reaction time, but not with increasing monomer concentration, indicating that both concentrations are in the saturation range of the enzyme. Presumably the enzymatic reaction is the rate-limiting step, i.e. the chemical reactions of the radicals are much faster than the enzymatic oxidation. The lower coloration at high concentration and longer reaction time is possibly due to enzyme inhibition and poor aqueous solubility of the ferulic acid at these specific reaction conditions.

Membranes grafted with 4-hydroxybenzoic acid showed an increase in ΔE* value, both with increasing monomer concentration and incubation time, indicating that the monomer concentrations were below the saturation concentration of the enzyme. Further increase of grafting degree is expected at higher monomer concentrations. These observations are in line with the changes in both L* and ΔC* values, since an increase in ΔE* corresponds to a decrease in L* and an increase in ΔC*.

XPS analyses were carried out on the membranes grafted with ferulic acid and 4-hydroxybenzoic acid. The results for the virgin and the grafted membranes are shown in Table 2. Most notable is the decrease in sulfur content, which is a good indication for reaction and/or formation of a new upper layer on the membrane which shields the underlying sulfur. For both carbon and oxygen, concentrations are found that are notably different from the virgin membrane which is another indication for the formation of an extra layer.

TABLE 2

Analysis of XPS spectra of grafted PES membranes, that were incubated for 24 hours, at pH 5 (0.1M sodium acetate buffer), 25° C., with 0.5 U · ml$^{-1}$ enzyme and at 28.8 mM substrate. For gallic acid, an additional experiment with an incubation time of 2 hours was executed.

| | Binding Energy (eV) | | | | |
|---|---|---|---|---|---|
| | $C_{1s}$ 285.4 ± 0.3 —C—S— | $C_{1s}$ 288.8 ± 0.5 C=O | $O_{1s}$ 533.2 ± 0.3 —C—O— | $N_{1s}$ 400.1 ± 0.1 —N— | $S_{2p}$ 169.0 ± 0.3 O=S=O |
| Sample | Atomic % | | | | |
| Unmodified PES | 77.01 | 16.99 | 15.56 | 2.15 | 5.30 |
| Ferulic acid | 74.77 | 9.98 | 22.38 | 1.01 | 1.84 |
| 4-hydroxybenzoic acid | 76.18 | 9.30 | 19.79 | 1.98 | 2.05 |
| Gallic acid | 74.95 | 3.62 | 18.38 | 2.10 | 4.65 |
| Gallic acid* | 74.50 | 5.09 | 19.20 | 2.44 | 3.85 |

*Incubation time 2 hours.

Interestingly, the flux of grafted membranes is not significantly influenced. For example, at 1 bar applied pressure, a grafted membrane (4-hydroxybenzoic acid 25° C., pH 5 (0.1 M sodium acetate buffer), 0.5 U·ml$^{-1}$ enzyme and 30 min incubation time) had a flux of 25.9±0.5 ml·cm$^{-2}$·min$^{-1}$, which was comparable to the blank membrane (24.5±0.5 ml·cm$^2$·min$^{-1}$). As a result, also the hydraulic resistances were comparable. In addition, the water uptake of the membrane is increased from 71.61% for the virgin, to 72.82 and 73.06% for membranes modified with 4.8 and 28.8 mM 4-hydroxybenzoic acid, respectively. This implies that the modified membranes have become more hydrophilic.

Figure 2A:
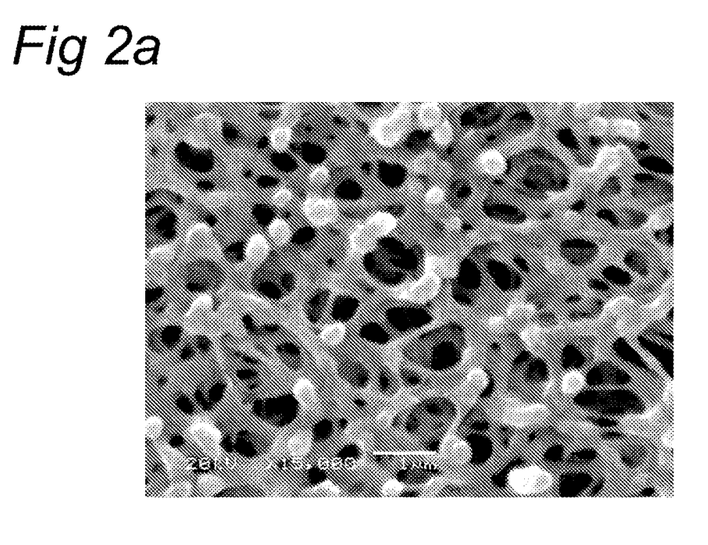
FIG. 2 depicts SEM pictures of polyethersulfone membranes modified with p-hydroxybenzoic acid (FIG. 2a) or gallic acid (FIG. 2b), and a blank (virgin) membrane (FIG. 2c).
Figure 2B:
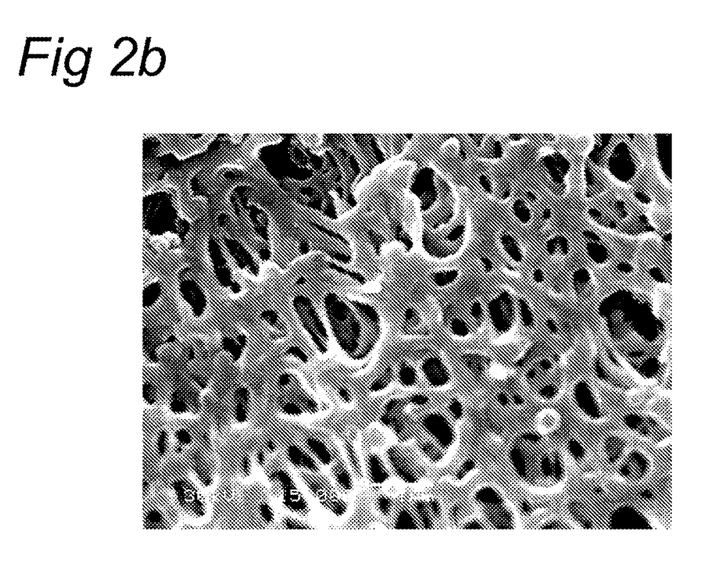
Figure 2C:
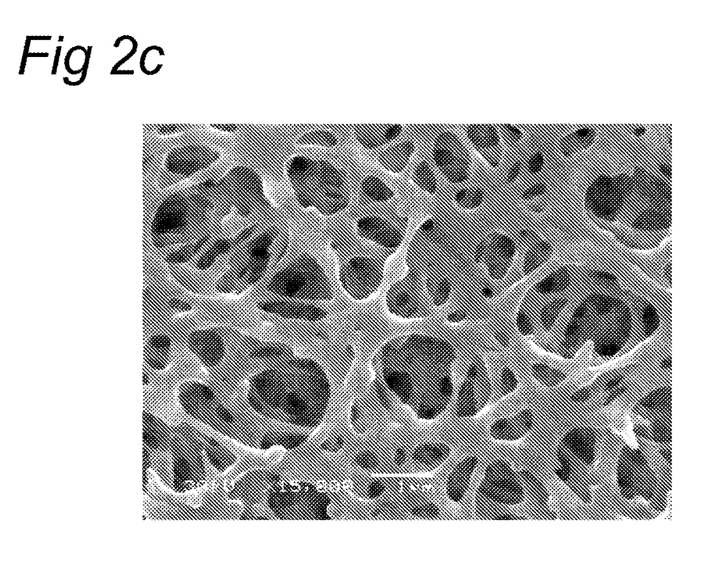

In FIG. 2 SEM pictures of PES membranes modified with p-hydroxybenzoic acid (FIG. 2a), gallic acid (FIG. 2b) and blank (virgin) membrane (FIG. 2c) are shown (magnification 15000×). The reaction conditions for p-hydroxybenzoic acid (FIG. 2a) were 4.8 mM substrate, 0.5 U·ml$^{-1}$ enzyme, 0.1 M sodium acetate buffer pH 7.0, 2 h incubation time at 24° C. Grafting occurs on the surface of the membrane and on the pore walls (12.73 μg·cm$^{-2}$ grafting yield). The substituents are divided over the surface. The reaction conditions for gallic acid (FIG. 2b) were 28.8 mM substrate, 0.5 U·ml$^{-1}$ enzyme, 0.1 M sodium acetate buffer pH 5.0, 10 min incubation time at 24° C. Grafting occurs all over the membrane surface as an extended network sheet.

The invention claimed is:

1. A process for grafting a poly(arylsulfone), comprising reacting in the presence of an enzyme a poly(arylsulfone) with a compound of the Formula (II):

(II)

wherein:
X is O, S or NH;
m is 0-5;
n is 0-5;
$R^1$ is independently selected from an electron-donating group having a negative value for the para-Hammett substituent constant $\sigma_p$, $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups, $C_6$-$C_{12}$ alkyl(hetero)aryl groups, $C_1$-$C_{12}$ alkoxy groups, $C_2$-$C_{12}$ alkenyloxy groups and $C_2$-$C_{12}$ alkynyloxy groups, wherein the alkyl groups, alkenyl groups, alkynyl groups, (hetero)aryl groups, (hetero)arylalkyl groups, alkyl(hetero)aryl groups, alkoxy groups, alkenyloxy groups and $C_2$-$C_{12}$ alkynyloxy groups are optionally substituted, and wherein the alkyl groups, alkenyl groups, alkynyl groups, alkoxy groups, alkenyloxy groups, alkynyloxy groups and the alkyl part of (hetero)arylalkyl groups and alkyl(hetero)aryl groups are optionally interrupted by one or more heteroatoms;
$R^2$ is independently selected from halogen, —$YR^3$, —$R^4YR^3$, —$N(R^3)_2$, —$R^4N(R^3)_2$, —$C(Y)R^3$, —$R^4C(Y)R^3$, —$C(Y)YR^3$, —$R^4C(Y)YR^3$ and —$\{X_p[C_6(XH)_q(R^1)_m(R^2)_n]\}_r$, wherein $R^1$, $R^2$, X, m and n are as defined above, wherein p=0 and q=1 or p=1 and q=0, wherein r is 1-200, wherein Y is O or S, wherein $R^3$ is independently selected from hydrogen, $C_1$-$C_{12}$ alkyl groups, $C_2$-$C_{12}$ alkenyl groups, $C_2$-$C_{12}$ alkynyl groups, $C_5$-$C_{12}$ (hetero)aryl groups, $C_6$-$C_{12}$ (hetero)arylalkyl groups and $C_6$-$C_{12}$ alkyl(hetero)aryl groups, wherein $R^4$ is independently selected from $C_1$-$C_{12}$ alkylene groups, $C_2$-$C_{12}$ alkenylene groups, $C_2$-$C_{12}$ alkynylene groups, $C_5$-$C_{12}$ (hetero)arylene groups, $C_6$-$C_{12}$ (hetero)arylalkylene groups, $C_6$-$C_{12}$ alkyl(hetero)arylene groups, $C_6$-$C_{12}$ alkylene(hetero)arylene groups, $C_7$-$C_{12}$ alkenylene(hetero)arylene groups, $C_7$-$C_{12}$ alkynylene(hetero)arylene groups, wherein the alkyl groups, alkenyl groups, alkynyl groups, (hetero)aryl groups, (hetero)arylalkyl groups, alkyl(hetero)aryl groups, alkylene groups, alkenylene groups, alkynylene groups, (hetero)arylene groups, (hetero)arylalkylene groups, alkyl(hetero)arylene groups, alkylene(hetero)arylene groups, alkenylene(hetero)arylene groups and alkynylene(hetero)arylene groups are optionally substituted, and wherein the alkyl groups, alkenyl groups, alkynyl groups, alkylene groups, alkenylene groups, alkynylene groups, the alkyl parts of the (hetero)arylalkyl groups, alkyl(hetero)aryl groups and alkyl(hetero)arylene groups, the alkylene parts of the (hetero)arylalkylene groups and alkylene(hetero)arylene groups, the alkenylene parts of the alkenylene(hetero)arylene groups and the alkynylene parts of the alkynylene(hetero)arylene groups are optionally interrupted by one or more heteroatoms; and optionally, when n≥2, two adjacent $R^2$ groups, together with the bonds connecting the two $R^2$ groups, form a cyclic alkyl group or a (hetero)aryl group, wherein the cyclic alkyl group and the (hetero)aryl group are optionally substituted.

2. The process according to claim 1, wherein the poly(arylsulfone) is a polyethersulfone, a polysulfone or a polyphenylsulfone.

3. The process according to claim 1, wherein the enzyme is an oxidoreductase.

4. The process according to claim 1, wherein the enzyme is a laccase, a tyrosinase, a polyphenol oxidase, a peroxidase, or a combination thereof.

5. The process according to claim 1, wherein $R^1$ is a hydroxyl group or an alkoxy group.

6. The process according to claim 1, wherein $R^2$ is selected from the group of —C(O)$OR^3$, —$R^4$C(O)$OR^3$, —N($R^3$)$_2$, —$OR_3$ and —$SR^3$.

7. The process according to claim 1, wherein the compound of the Formula (II) is selected from the group consisting of phenolic acids and substituted phenolic acids.

8. The process according to claim 1, wherein the reacting is performed at a pH in the range of about 2 to about 12.

9. The process according to claim 1, wherein the reacting is performed at a temperature is in the range of about 0° C. to about 100° C.

10. The process according to claim 1, wherein the reacting is performed at a pH between about 4 to about 8 and a temperature between about 10° C. to about 60° C.

* * * * *